US008790179B2

(12) United States Patent
Kim

(10) Patent No.: US 8,790,179 B2
(45) Date of Patent: Jul. 29, 2014

(54) SAFETY SCHEME FOR GESTURE-BASED GAME SYSTEM

(75) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/636,794

(22) PCT Filed: Feb. 24, 2012

(86) PCT No.: PCT/US2012/026515
§ 371 (c)(1),
(2), (4) Date: Sep. 24, 2012

(87) PCT Pub. No.: WO2013/126071
PCT Pub. Date: Aug. 29, 2013

(65) Prior Publication Data
US 2013/0225296 A1  Aug. 29, 2013

(51) Int. Cl.
*G06F 17/00* (2006.01)
(52) U.S. Cl.
USPC .......................................................... 463/37
(58) Field of Classification Search
USPC ......................................... 463/35–37, 39–43
See application file for complete search history.

(56) References Cited

U.S. PATENT DOCUMENTS

| | | | |
|---|---|---|---|
| 6,663,491 B2 * | 12/2003 | Watabe et al. | 463/36 |
| 6,738,066 B1 | 5/2004 | Nguyen | |
| RE41,414 E | 7/2010 | Yamamoto | |
| 2007/0110298 A1 | 5/2007 | Graepel et al. | |
| 2009/0077504 A1 | 3/2009 | Bell et al. | |
| 2009/0221374 A1 | 9/2009 | Yen | |
| 2010/0148977 A1 | 6/2010 | Tseng et al. | |

(Continued)

FOREIGN PATENT DOCUMENTS

| | | |
|---|---|---|
| JP | 2010-137097 | 6/2010 |
| JP | 2011-189066 | 9/2011 |
| KR | 10-2005-0047024 | 5/2005 |
| KR | 10-2007-0032842 | 3/2007 |
| KR | 10-2009-0090980 | 8/2009 |
| KR | 10-2010-0032699 | 3/2010 |

OTHER PUBLICATIONS

International Search Report and Written Opinion from International Application No. PCT/US2012/026515 mailed May 31, 2012.

(Continued)

*Primary Examiner* — Ronald Laneau
(74) *Attorney, Agent, or Firm* — Brundidge & Stanger, P.C.

(57) ABSTRACT

Technologies are generally described for a safety scheme for a gesture-based game. In some examples, a method performed under control of a gesture-based game system may include detecting a presence of at least one first obstacle between a first distance from a player and a second distance from the player that is less than the first distance, and determining a recommended position for the player based at least in part on a location of the detected first obstacle.

22 Claims, 11 Drawing Sheets

(56) References Cited

U.S. PATENT DOCUMENTS

| | | |
|---|---|---|
| 2010/0210359 A1 | 8/2010 | Krzeslo et al. |
| 2010/0234094 A1 | 9/2010 | Gagner et al. |
| 2010/0277411 A1 | 11/2010 | Yee et al. |
| 2011/0080490 A1 | 4/2011 | Clarkson et al. |
| 2011/0119640 A1 | 5/2011 | Berkes et al. |
| 2011/0185309 A1* | 7/2011 | Challinor et al. ............ 715/784 |
| 2011/0230263 A1 | 9/2011 | Ng |
| 2012/0122574 A1 | 5/2012 | Fitzpatrick et al. |
| 2013/0260864 A1* | 10/2013 | Gomez et al. ................... 463/20 |

OTHER PUBLICATIONS

International Search Report and Written Opinion from International Application No. PCT/KR11/006430 mailed Apr. 30, 2012.

http://www.dooyoo.co.uk./playstation-2-game/eyetoy-play-camera/1017264/ (2012).

International Search Report and Written Opinion from International Application No. PCT/KR11/004855 mailed Apr. 4, 2012.

International Search Report and Written Opinion from International Application No. PCT/KR11/009324 mailed Aug. 31, 2012.

\* cited by examiner

SAFETY SCHEME FOR GESTURE-BASED GAME SYSTEM

BACKGROUND

Camera technology and gesture recognition technology have experienced phenomenal growth in the last few years. Game devices have adopted such technologies. For example, a game device may utilize a camera to capture and recognize a gesture of a player and use the recognized gesture of the player as an input signal for playing a game

SUMMARY

In an example, a method performed under control of a gesture-based game system may include detecting a presence of at least one first obstacle between a first distance from a player and a second distance from the player that is less than the first distance, and determining a recommended position for the player based at least in part on a location of the at least one first obstacle.

In another example, a position recommendation component for a gesture-based game system may include an obstacle detecting unit configured to detect a presence of and determine a location of at least one first obstacle between a first distance from a player and a second distance from the player that is less than the first distance, a recommended position determining unit configured to determine a recommended position for the player based at least in part on the location of the at least one first obstacle, and a image generation unit configured to generate at least one image for guiding the player to the recommended position.

In yet another example, a computer-readable storage medium may have stored thereon computer-executable instructions that, in response to execution, cause a gesture-based game system to perform operations, including detecting one or more obstacles located within a first distance from a player, generating an alarm if at least some of the detected obstacles are located within a second distance from the player that is less than the first distance, determining a recommended position for the player based at least in part on locations of the detected one or more obstacles if all of the detected one or more obstacles are located between the second distance and the first distance, and guiding the player to the recommended position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
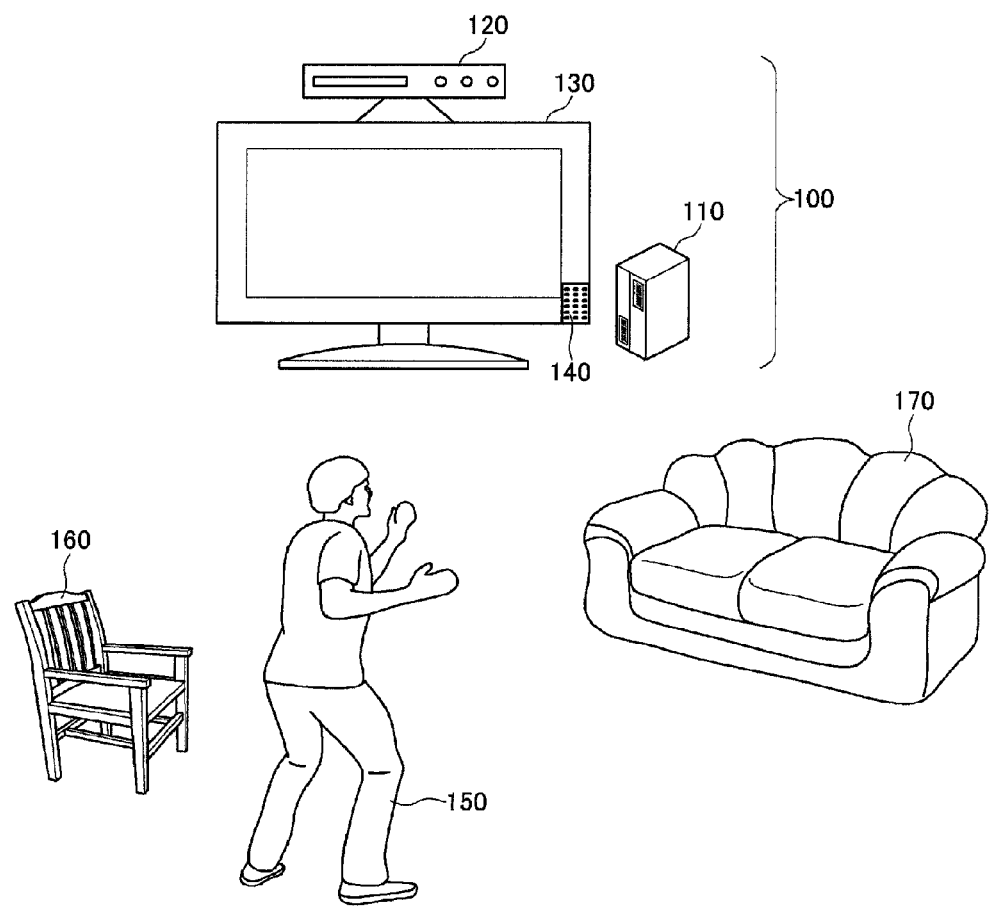
FIG. 1 schematically shows an illustrative example of an environment in which a player interacts with a gesture-based game system in the vicinity of obstacles, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a safety scheme for gesture-based game systems.

Technologies are generally described for a gesture-based game system configured to determine a recommended position for a player of a gesture-based game run, executed, played on, hosted by, or otherwise facilitated by the gesture-based game system to play the gesture-based game by reducing the risk of collision with nearby obstacles, and generate and display a position image associated with the recommended position to guide the player to the recommended position. In some embodiments, the gesture-based game system may determine locations of the player and obstacles located within a playing space. Among the obstacles, an obstacle located relatively close to the player may be required to be moved before the gesture-based proceeds, while alternative embodiments may include a strong warning or suggestion that the obstacle be moved, yet still proceed with the gesture-based game. Further, another obstacle that is determined to be located relatively far from the player may be determined to be at a safe distance from the player, and the gesture-based game may proceed.

In some embodiments, the gesture-based game system may detect a presence of at least one first obstacle between a first distance from the player and a second distance from the player that is less than the first distance. It may be advisable for the player to move at least the detected first obstacle. Further, the gesture-based game system may detect a presence of at least one second obstacle within the second distance from the player. It may be necessary for the player to move the at least one second obstacle, and the gesture-based game may not proceed to a next step without moving at least the detected second obstacle. However, alternative embodiments may include a strong warning or suggestion that the detected second obstacle be moved, yet still proceed with the gesture-based game.

In some embodiments, the gesture-based game system may utilize a display to notify the player of the presence of the detected obstacles. By way of example, not as a limitation, the gesture-based game system may generate and display in the display at least one first outline image (in a distinctive color, e.g., blue) associated with the at least one first obstacle and at least one second outline image (in a different distinctive color, e.g., red) associated with the second detected obstacle. The second outline image (which may be in red) may indicate that the corresponding obstacle (i.e., the detected second obstacle) should be moved. In some embodiments, the gesture-based game system may further provide to the player a warning message associated with the second detected obstacle informing that the second detected obstacle should be moved before the gesture-based game is able to proceed.

In some embodiments, if there is no obstacle located within the second distance from the player, the gesture-based game system may proceed to determine a recommended position, at which the player may play the gesture-based game by reducing the risk of collision with remaining obstacles, by considering the locations of remaining obstacles. By way of example, all or some of the detected second obstacle or even further detected obstacles may remain in place for various reasons (e.g., such obstacles may be immovable). The gesture-based game system may generate and display in the display a position image associated with the recommended position so that the player may move to the recommended position.

FIG. 1 schematically shows an illustrative example of an environment in which a player interacts with a gesture-based game in the vicinity of obstacles, arranged in accordance with at least some embodiments described herein. As depicted in FIG. 1, a player 150 may play a gesture-based game run, executed by, played on, hosted by, or otherwise facilitated by a gesture-based game system 100. The gesture-based game may be played by having a camera 120 recognize gestures made by player 150, which serve as player input. By way of example, but not as a limitation, gesture-based games played or hosted on gesture-based game system 100 may include, as examples only, a first-person shooter game, dancing, racing, extreme sports (such as skateboarding, snowboarding, motocross, etc.), boxing game, or golf.

In some embodiments, gesture-based game system 100 may include a game console 110, camera 120, a display 130 and an audio device 140. Game console 110 may facilitate execution of a gesture-based game. Although illustrated as discrete components, various components of gesture-based game system 100 may be divided into additional components, combined into fewer components, or eliminated altogether, depending on the desired implementation. For example, camera 120 may be included as a component of the game console 110.

Game console 110 may be configured to run, execute, play, host, or otherwise facilitate the gesture-based game. By way of example, but not as a limitation, when player 150 inserts a game, such as, but not limited to, a compact disk (CD) or a game digital versatile disk (DVD), of the gesture-based game into game console 110, game console 110 may start executing the gesture-based game. In some embodiments, gesture-based game system 100 may be connected to a cloud game server or a component of a cloud game system, and game console 110 may run, execute, host, or otherwise facilitate the gesture-based game provided by the cloud game server or the cloud game system.

Camera 120 may be configured to capture, detect, and/or recognize a person within a predetermined detectable area (e.g., field of view of camera 120) and recognize the person as player 150 of the game run, executed by, played on, hosted by, or otherwise facilitated by game console 110. Camera 120 may be further configured to capture, detect, and/or recognize obstacles 160 and 170 within a playing space associated with the game run or executed by game console 110. Camera 120 may be one of a set of input devices associated with gesture-based game system 100. In some embodiments, camera 120 may detect a movement of player 150 and transmit the detected movement, as an electrical signal, to game console 110. By way of example, but not as a limitation, camera 120 may be capable of determining gesture depth, facial feature recognition, gesture recognition, and may further include a microphone for audio and/or voice recognition. Accordingly, camera 120 may include a wide variety of imaging devices which may have the capability of recognizing player 150 and/or recognizing his/her gestures, and so forth.

Display 130 may be configured to display the gesture-based game run, executed by, played on, hosted by, or otherwise facilitated by game console 110. In some embodiments, display 130 may display an image of player 150 or an avatar image that is associated with player 150. In some embodiments, display 130 may also display images of obstacles 160 and 170, so as to aid in reducing the risk of collision between player 150 and obstacles 160 and 170 during playing the gesture-based game, in accordance with various embodiments. In some embodiments, game console 110 may determine whether obstacles 160 and 170 are located within a playing space associated with a game being currently played by player 150 based at least in part on the images captured, detected, and/or recognized by camera 120. Game console 110 may further instruct display 130 to display outline images respectively associated with obstacles 160 and 170 based at least in part on the determination. By way of example, display 130 may include, but is not limited to, a liquid crystal display (LCD), a plasma display panel (PDP), a light emitting diode (LED) backlight display device, or other display device.

Audio device 140 is one of a set of output devices of gesture-based game system 100. Audio device 140 may output background music or sound effects of the gesture-based game as the game proceeds. Audio device 140 may be provided as a part of display 130 as shown in FIG. 1 or as a separate device.

Figure 2:
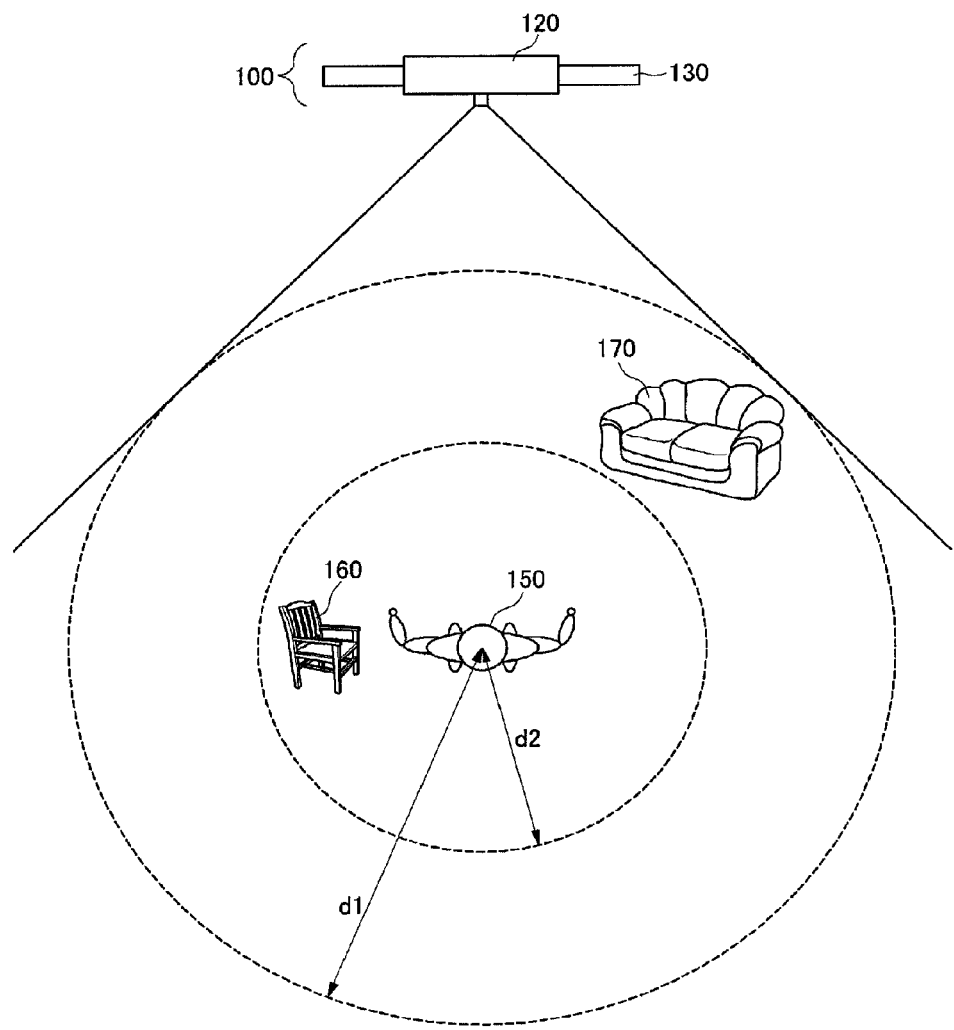
FIG. 2 schematically shows an illustrative example of an environment in which a player interacts with a gesture-based game system in the vicinity of obstacles, arranged in accordance with at least some embodiments described herein.

FIG. 2 schematically shows an illustrative example of an environment in which a player interacts with a gesture-based game system in the vicinity of obstacles, arranged in accordance with at least some embodiments described herein.

Although FIG. 2 illustrates one player interacting with gesture-based game system 100, it should be appreciated by one skilled in the relevant art that two or more players may interact with the gesture-based game system 100 at the same time.

As depicted in FIG. 2, player 150 may interact with gesture-based game system 100, by playing a certain game, and obstacles 160 and 170 may be located within a playing space associated with the game played by player 150. Camera 120 may capture, detect, and/or recognize images of player 150 and obstacles 160 and 170, and gesture-based game system 100 may determine a location of player 150 and locations of obstacles 160 and 170 in the playing space based at least in part on the captured image. Obstacle 170 may be located between a first distance d1 from player 150 and a second distance d2 from player 150 and obstacle 160 may be located within second distance d2 from player 150. Second distance d2 may be less than first distance d1 from player 150. In some embodiments, it may be advisable for player 150 to move obstacle 170 (i.e., a "movement-advisable obstacle"), but not necessary in order for the game to proceed, since the possibility of collision with such obstacle is relatively low. On the contrary, it may be necessary to move obstacle 160 (i.e., a "movement-necessary obstacle") in order for the game to proceed, since the possibility of collision with such obstacle is relatively high. Gesture-based game system 100 may determine that obstacle 160 is the movement-necessary obstacle and obstacle 170 is the movement-advisable obstacle based on the respective locations.

In some embodiments, gesture-based game system 100 may determine whether each of obstacles 160 and 170 is the movement-necessary obstacle or the movement-advisable obstacle based, at least in part, on types of movements that player 150 may likely make in playing the particular gesture-based game. The types of movements may include, but not limited thereto, left-right lateral movements and/or forward-backward lateral movements. By way of example, but not as a limitation, if the gesture-based game requires only left-right lateral movements, then gesture-based game system 100 may determine an obstacle located in the front or the back of player 150 as a movement-advisable obstacle; and, conversely, if the gesture-based game requires only forward-backward lateral movements, then gesture-based game system 100 may determine an obstacle located to either side of player 150 as a movement-advisable obstacle.

In some embodiments, first distance d1 and/or second distance d2 may vary depending on the particular gesture-based game being played on gesture-based game system 100. By way of example, but not as a limitation, a gesture-based game that requires small player gestures (such as a car racing game where a player is not required to move much or make large gestures to play the game) will typically have smaller gesture ranges for its players (and thus first distance d1 and second distance d2 may be relatively short) when compared to a gesture-based game that requires larger player gestures (such as a tennis game where a player may make large lateral movements and gestures to play the game).

Figure 3A:
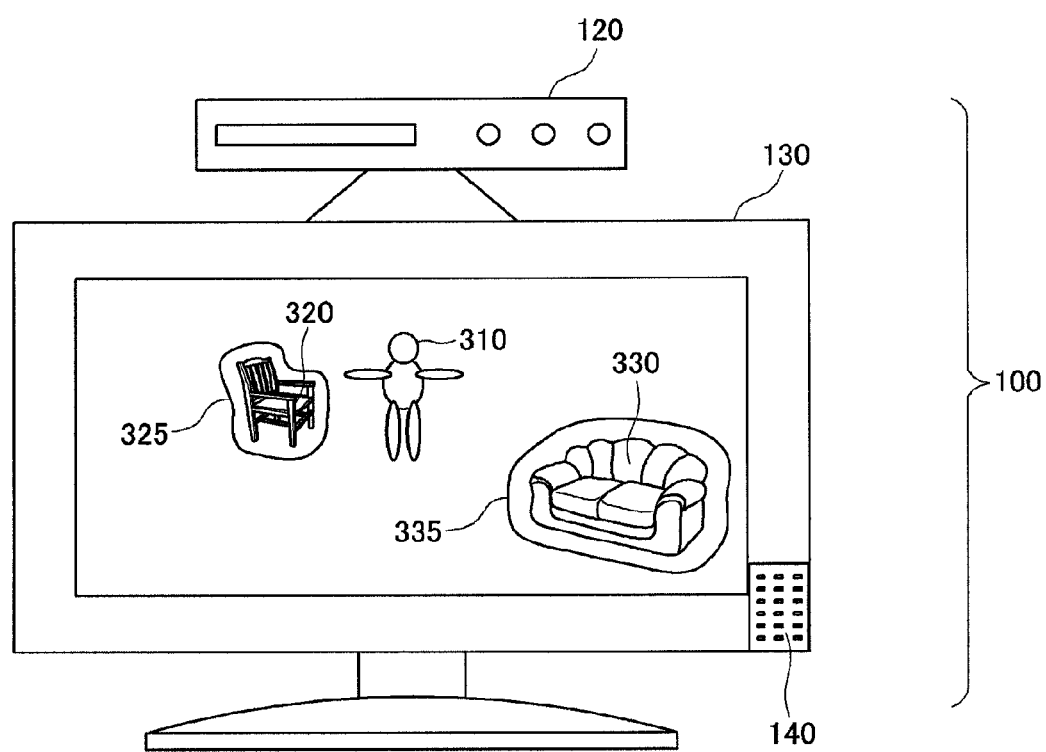
FIGS. 3A-C schematically show an illustrative example of a display area when a player interacts with a gesture-based game system in the vicinity of obstacles as in FIG. 2, arranged in accordance with at least some embodiments described herein.
Figure 3B:
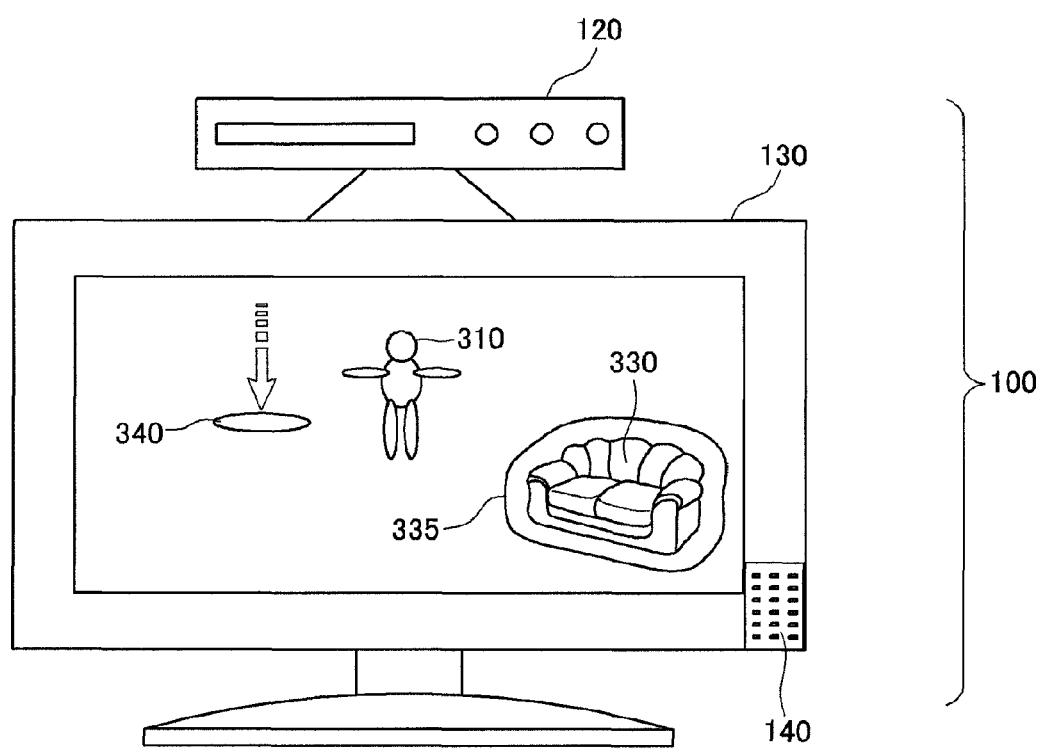
Figure 3C:
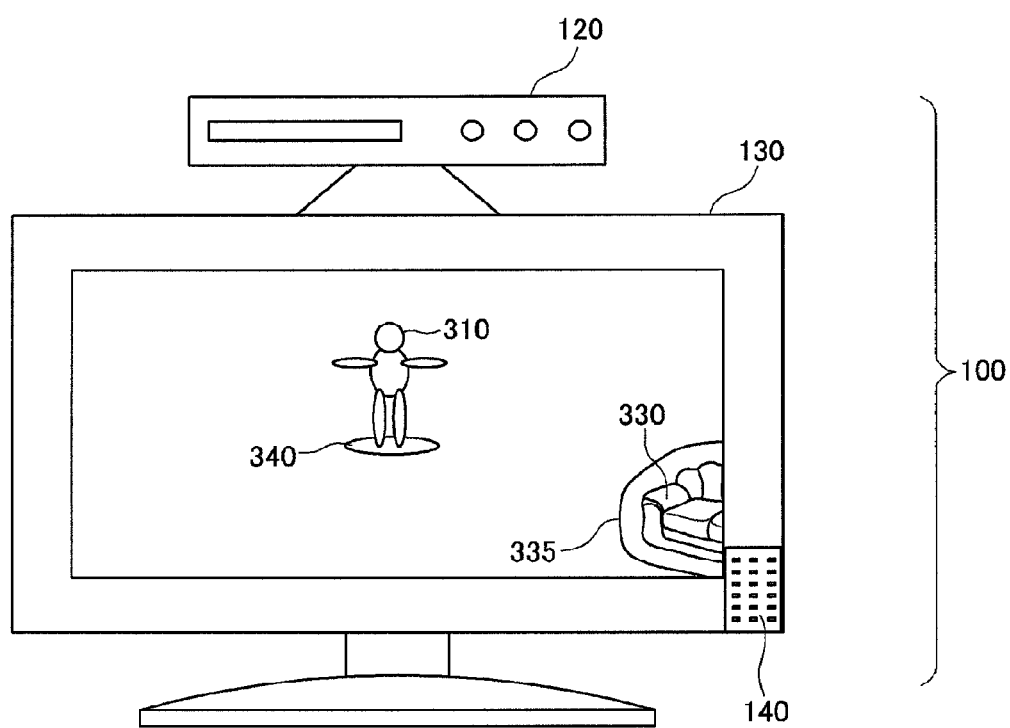

FIGS. 3A-C schematically show an illustrative example of a display area when a player interacts with a gesture-based game system in the vicinity of obstacles as in FIG. 2, arranged in accordance with at least some embodiments described herein. Although FIGS. 3A-C illustrate one player interacting with gesture-based game system 100, it should be appreciated by one skilled in the relevant art that two or more of players may interact with the gesture-based game system at the same time.

As depicted in FIG. 3A, display 130 may display a player image 310 associated with player 150, an obstacle image 320 associated with obstacle 160 and an obstacle image 330 associated with obstacle 170, each of which may be generated by game console 110. Display 130 may further display an outline image 325 associated with obstacle 160 and an outline image 335 associated with obstacle 170, each of which may also be generated by game console 110. Game console 110 may generate each of outline images 325 and 335 in a different color depending on whether corresponding obstacle is a movement-necessary obstacle or a movement-advisable obstacle. By way of example, but not as a limitation, outline image 325 (whose corresponding obstacle 160 is a movement-necessary obstacle) may be generated in a distinctive color, e.g., red, while outline image 335 (whose corresponding obstacle 170 is the movement-advisable obstacle) may be generated in a different distinctive color, e.g., blue. The outline image 325 (i.e., in red) may indicate that it may be necessary to move the corresponding obstacle (i.e., obstacle 160) out of the playing space, otherwise gesture-based game system 100 may not proceed. Further, the outline image 335 (i.e., in blue) may indicate that it may be advisable to move the corresponding obstacle (i.e., obstacle 170) out of the playing space, gesture-based game system 100 may proceed even if the corresponding obstacle is not moved. In some embodiments, display 130 may further display a warning message associated with the outline image 325 (i.e., in red) indicating that the corresponding movement-necessary obstacle (i.e., obstacle 160) should be moved.

FIG. 3B schematically shows that obstacle image 320 and its outline image 325 are removed in display 130, as the corresponding movement-necessary obstacle (i.e., obstacle 160) has been moved out of the playing space. Since the movement-necessary obstacle (i.e., obstacle 160) has been moved out of the playing space, gesture-based game system 100 may proceed.

In some embodiments, game console 110 may proceed to determine a recommended position for player 150 when there is no movement-necessary obstacle in the playing space. The recommended position may be a location for player 150 to play the gesture-based game without colliding with the remaining obstacle (i.e., obstacle 170). A process for determining the recommended position will be described in more details with reference FIGS. 4A-B below. Game console 110 may further generate a position image 340 associated with the recommended position to be displayed in display 130. Position image 340 may guide player 150 to the recommended position.

FIG. 3C schematically shows that player image 310 is moved to the location of position image 340, as player 150 has moved to the recommended position. In some embodiments, position image 340 may not be positioned in the middle of display 130 as illustrated in FIG. 3B. In such cases, camera 120 may be adjusted (i.e., pan, tilt, or zoom) for position image 340 to be positioned in the middle of display 130, as depicted in FIG. 3C. Then, gesture-based game system 100 may proceed.

As such, since gesture-based game system 100 may determine whether each obstacle is a movement-advisable obstacle or a movement-necessary obstacle based at least in part on a determined location of each obstacle, and may further generate and display in a display outline images respectively indicating whether a corresponding obstacle is a movement-advisable obstacle or a movement-necessary obstacle, a player of a gesture-based game run, executed by, played on, hosted by, or otherwise facilitated by gesture-based game system 100 may move the movement-necessary obstacle out of a playing space. Further, since gesture-based game system 100 may determine a recommended position in which danger of collision with the remaining obstacle (i.e., the movement-advisable obstacle) may be minimized, and may generate and display in the display a position image associated with the recommended position to guide the player to the recommended position, the player of the gesture-based game run, executed by, played on, hosted by, or otherwise facilitated by gesture-based game system 100 may play the game by reducing a danger of collision with nearby obstacles.

Figure 4A:
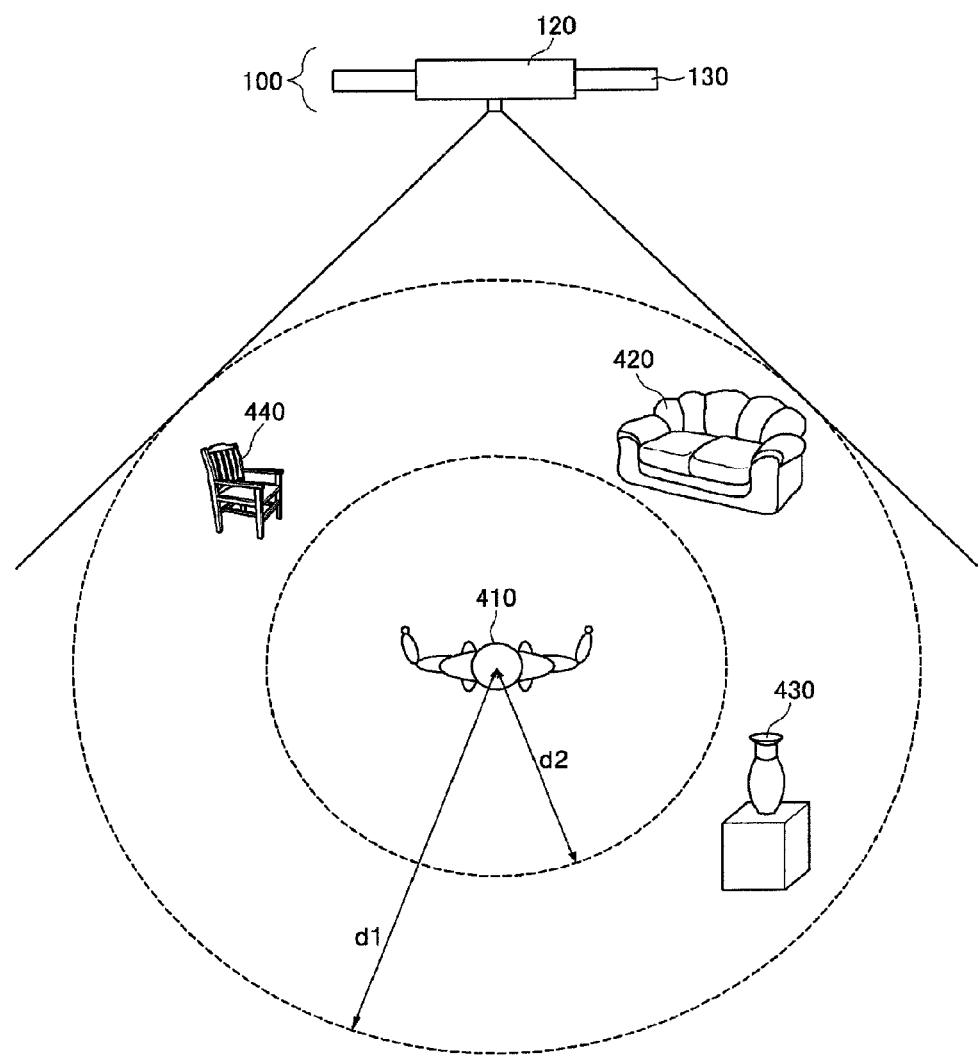
FIG. 4A schematically shows an illustrative example of an environment in which a player interacts with a gesture-based game system in the vicinity of obstacles, arranged in accordance with at least some embodiments described herein.
Figure 4B:
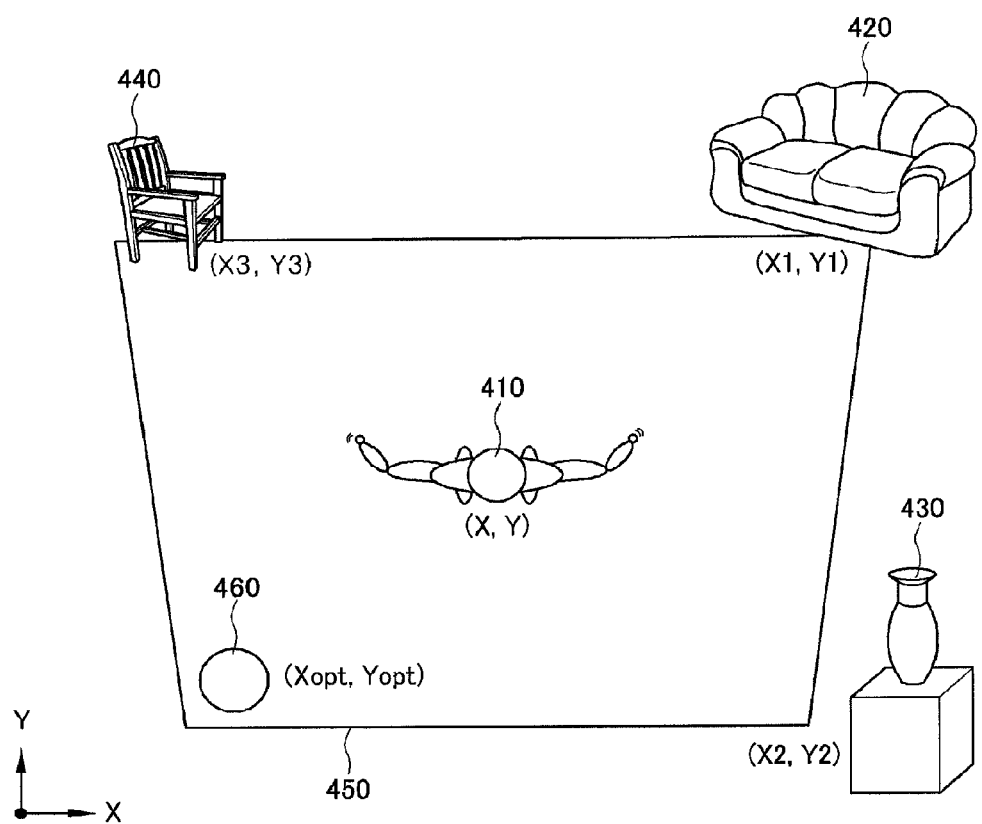
FIG. 4B schematically shows an illustrative example for determining a recommended position for a player when the player interacts with a gesture-based game system in the vicinity of obstacles as in FIG. 4A, arranged in accordance with at least some embodiments described herein.

FIG. 4A schematically shows an illustrative example of an environment in which a player interacts with a gesture-based game system in the vicinity of obstacles, arranged in accordance with at least some embodiments described herein; and FIG. 4B schematically shows an illustrative example for determining a recommended position for a player when the player interacts with a gesture-based game system in the vicinity of obstacles as in FIG. 4A, arranged in accordance with at least some embodiments described herein. Although FIGS. 4A-B illustrate one player interacting with gesture-based game system 100, it should be appreciated by one skilled in the relevant art that two or more players may interact with the gesture-based game system 100 at the same time.

As depicted in FIG. 4A, all of obstacles 420, 430 and 440 are located between a first distance d1 from player 410 and a second distance d2 from player 410. That is, all of obstacles 420, 430 and 440 are movement-advisable obstacles as explained above with reference to FIG. 2, and none of obstacles 420, 430, and 440 need to be moved in order for gesture-based game system 100 to proceed. In some embodiments, when there is no movement-necessary obstacle, gesture-based game system 100 may proceed to determine a recommended position (in which danger of collision with obstacles may be minimized) based, at least in part, on the locations of the movement-advisable obstacles (i.e., obstacles 420, 430 and 440).

By way of example, but not as a limitation, gesture-based game system 100 may determine the recommended position for player 410 in the following manner. As depicted in FIG. 4B, player 410 may be positioned within an area 450 and a location of player may be represented as (X, Y). Further, the location of obstacle 420 may be represented as (X1, Y1), the location of obstacle 430 may be represented as (X2, Y2) and the location of obstacle 440 may be represented as (X3, Y3). A distance between player 410 and each of obstacles 420, 430 and 440 may be obtained, according to the following equation:

$$Di(X,Y) = \|(X,Y) - (Xi, Yi)\|^2, \; i=1, 2 \text{ and } 3$$

Among the three obtained distances, i.e., D1(X, Y), D2(X, Y) and D3(X, Y), the shortest distance may be referred to as Dmin(X, Y). Dmin(X, Y) may represent a distance from the location of player 140 to the location of the closest obstacle. Gesture-based game system 100 may calculate Dmin(X, Y) for each coordinate (X, Y) within area 450 and obtain coordinates (X, Y) which maximize Dmin(X, Y). The coordinates (X, Y) which maximize Dmin(X, Y) may be a recommended position 460 having coordinates represented as (Xopt, Yopt), as shown in FIG. 4B. As described with reference FIG. 3B, gesture-based game system 100 may generate and display a position image associated with recommended position 460 in order to guide player 410 to recommended position 460.

Although FIGS. 4A-B illustrate that three obstacles are located between first distance d1 from player 410 and second distance d2 from player 410 and recommended position 460 is determined based on the three obstacles, it should be appreciated by one skilled in the relevant art that gesture-based game system 100 may determine a recommended position based on any number of obstacles located between first distance d1 and second distance d2.

Figure 5:
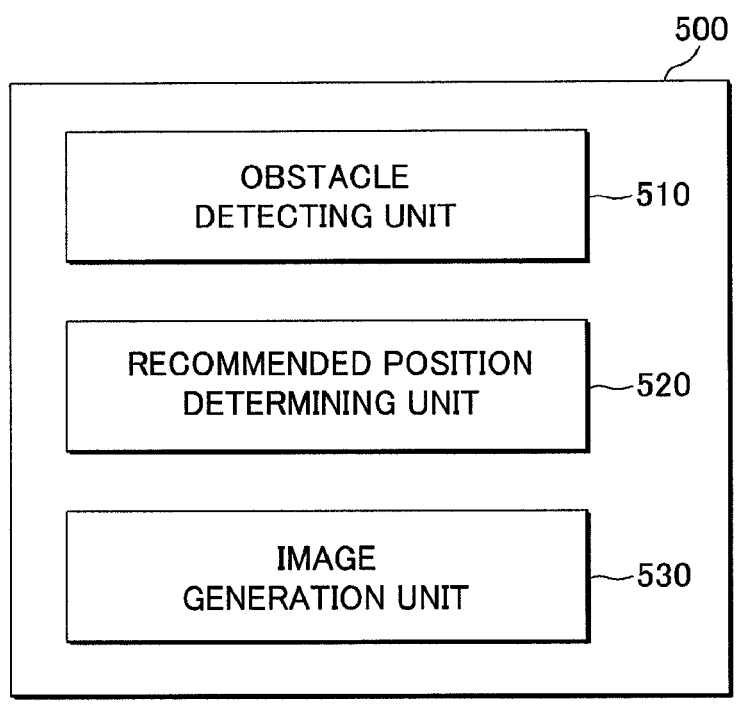
FIG. 5 shows a schematic block diagram illustrating an example architecture for providing a safety scheme for a gesture-based game system, arranged in accordance with at least some embodiments described herein.

FIG. 5 shows a schematic block diagram illustrating an example architecture for providing a safety scheme for a gesture-based game system, arranged in accordance with at least some embodiments described herein. As depicted, gesture-based game system 500 may include an obstacle detecting unit 510, a recommended position determining unit 520 and an image generation unit 530. Although illustrated as discrete components, various components may be divided into additional components, combined into fewer components, or eliminated altogether while being contemplated within the scope of the disclosed subject matter.

Obstacle detecting unit 510 may be configured to detect a presence of at least one first obstacle that is located between a first distance from a player and a second distance from the player and a presence of at least one second obstacle that is located within the second distance from the player. The second distance may be less than the first distance, and at least one of the first distance and the second distance may be predetermined based on a game run on, executed by, played on, hosted by, or otherwise facilitated by gesture-based game system 500. Obstacle detecting unit 510 may further determine a location of the at least one first obstacle and a location of the at least one second obstacle. In some embodiments, obstacle detecting unit 510 may detect the presence, and determine the location, of the first detected obstacle and the second detected obstacle based at least in part on an image signal received from a camera (not shown).

Recommended position determining unit 520 may be configured to determine a recommended position for the player based, at least in part, on the location of the first detected obstacle. The recommended position may be configured for the player to play the game played on gesture-based game system 500 without colliding with the first detected obstacle. Recommended position determining unit 520 may not proceed to determine the recommended position for the player when obstacle detecting unit 510 detects the presence of the second obstacle that is located within the second distance from the player. By way of example, but not as a limitation, recommended position determining unit 520 may determine the recommended position according to the process described above with reference FIG. 4B.

Image generation unit 530 may be configured to generate at least one image for guiding the player to the recommended position. By way of example, but not as a limitation, image generation unit 530 may generate a position image associated with the recommended position to be displayed on a display. In some embodiments, image generation unit 530 may generate at least one first outline image respectively associated with the at least one first obstacle located between the first distance and the second distance and at least one second outline image respectively associated with the at least one second obstacle located within the second distance. By way of example, but not as a limitation, the at least one first outline image may be generated in a distinctive color, e.g., blue, and the at least one second outline image may be generated in a different distinctive color, e.g., red. The red outline image may indicate that it is necessary to move the second detected obstacle, and the blue outline image may indicate that it is advisable to move the at first detected obstacle.

As such, if obstacle detecting unit 510 detects the at least one first obstacle and/or the at least one second obstacle, image generation unit 530 may generate the first outline image and/or the second outline image to be displayed together with a corresponding obstacle image on a display (not shown). The second outline image may indicate that it is necessary to move the second obstacle. By way of example, but not as a limitation, the display may display a warning message associated with the second outline image indicating that the second obstacle should be moved. If there no second obstacle is found within the second distance from the player, recommended position determining unit 520 may proceed to determine the recommended position based, at least in part, on the remaining first obstacle. Then, image generation unit 530 may generate the position image associated with the recommended position to be displayed on the display to guide the player to the recommended position.

Figure 6:
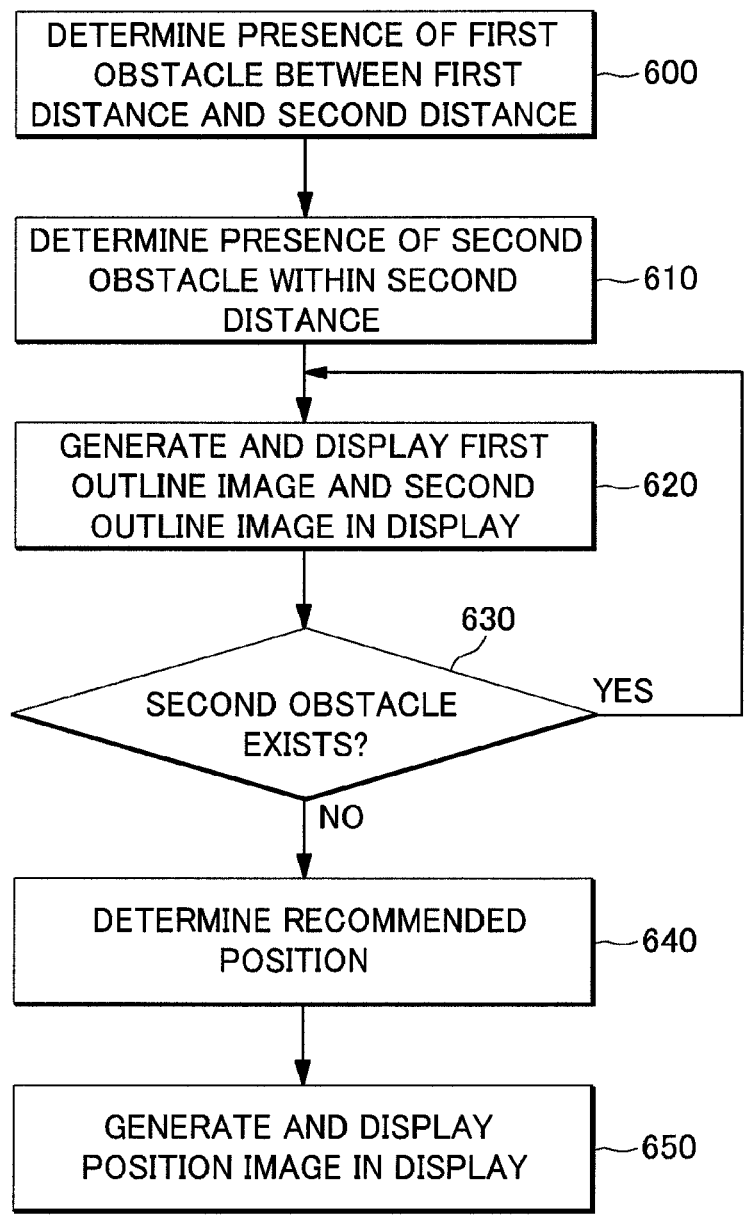
FIG. 6 shows an example flow diagram of a process for providing a safety scheme for a gesture-based game system, arranged in accordance with at least some embodiments described herein.

FIG. 6 shows an example flow diagram of a process for providing a safety scheme for a gesture-based game system, in accordance with at least some embodiments described herein. The method in FIG. 6 may be implemented in a gesture-based game system including obstacle detecting unit 510, recommended position determining unit 520 and image generation unit 530 discussed above. An example process may include one or more operations, actions, or functions as illustrated by one or more blocks 600, 610, 620, 630, 640 and/or 650. Although illustrated as discrete blocks, various blocks may be divided into additional blocks, combined into fewer blocks, or eliminated, depending on the desired implementation. Processing may begin at block 600.

At block 600, the gesture-based game system may determine a presence of at least one first obstacle located between a first distance from a player and a second distance from the player that is less than the first distance. In some embodiments, the gesture-based game system may determine the presence of the first obstacle based at least in part on an image captured by using a camera, which may be a component of the gesture-based game system. Processing may continue from block 600 to block 610.

At block 610, the gesture-based game system may determine a presence of at least one second obstacle located within the second distance from the player. In some embodiments, the gesture-based game system may determine the presence of the second obstacle based at least in part on an image captured by using the camera. Processing may continue from block 610 to block 620.

At block 620, the gesture-based game system may generate at least one first outline image associated with the detected first obstacle and at least one second outline image associated with the detected second obstacle, and display the first outline image and the second outline image on a display, which may be a component of the gesture-based game system. In some embodiments, the gesture-based game system may generate the first outline image and the second outline image in different distinct colors. For example, the gesture-based game system may generate the first outline image in blue and generate the second outline image in red. The second outline image may indicate that it is necessary for the player to move the second obstacle before the gesture-based game is able to proceed. Accordingly, the gesture-based game system may further generate and display a warning message associated with the red outline image informing that the second obstacle should be moved in order for the gesture-based game to proceed. Processing may continue from block 620 to block 630.

At block 630, the gesture-based game system may determine whether the detected second obstacle exists within the second distance from the player. If the detected second obstacle exists within the second distance from the player, processing may not proceed to the next step and return to the previous step. If the detected second obstacle does not exist within the second distance from the player, processing may continue from block 630 to block 640.

At block 640, the gesture-based game system may determine a recommended position for the player based, at least in part, on a location of the first obstacle. The recommended position may be configured for the player to play a game played on the gesture-based game system without colliding with the detected first obstacle. By way of example, but not as a limitation, the gesture-based game system may determine the recommended position according to the process explained above with reference FIG. 4B. Processing may continue from block 640 to block 650.

At block 650, the gesture-based game system may generate a position image associated with the recommended position and display the position image on the display. In some embodiments, the position image may guide the player to the recommended position.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
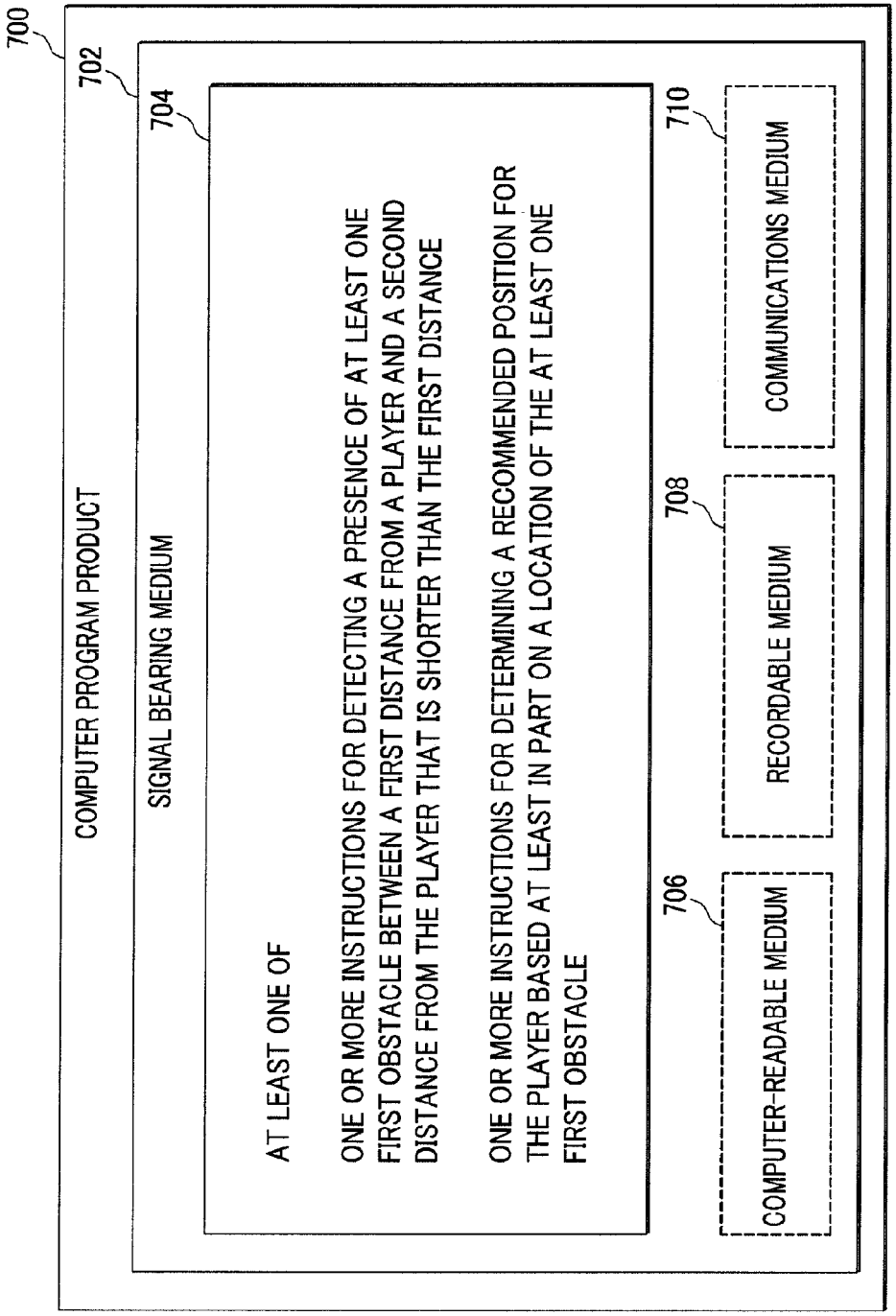
FIG. 7 illustrates computer program products that can be utilized to provide a safety scheme for a gesture-based game system, arranged in accordance with at least some embodiments described herein.

FIG. 7 illustrates computer program products 700 that may be utilized to provide a safety scheme for a gesture-based game system in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for detecting a presence of at least one first obstacle between a first distance from a player and a second distance from the player that is shorter than the first distance; one or more instructions for determining a recommended position for the player based at least in part on a location of the at least one first obstacle. Thus, for example, referring to FIG. 5, gesture-based game system 500 may undertake one or more of the blocks shown in FIG. 6 in response to instructions 704.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of gesture-based game system 500 by an RF signal bearing medium 702, where the signal bearing medium 702 is conveyed by a wireless communications medium 710 (e.g., a wireless communications medium conforming with the IEEE 802.11 standard). In some implementations, program product 700 may be executed on a cloud game server or a component of a cloud game system, both of which may be communicatively coupled to gesture-based game system 500.

Figure 8:
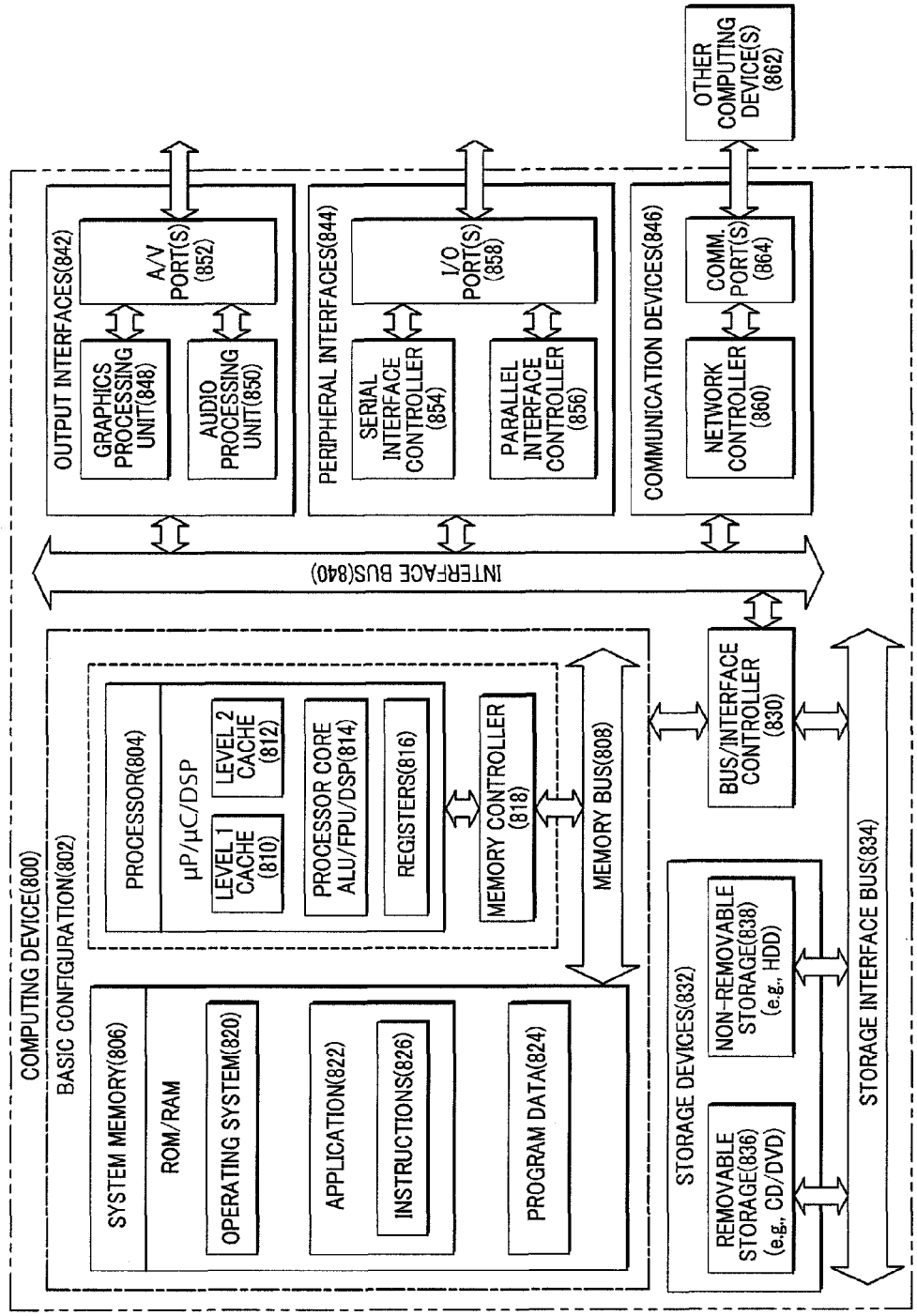
FIG. 8 is a block diagram illustrating an example computing device that can be utilized to provide a safety scheme for a gesture-based game system, arranged in accordance with at least some embodiments described herein.

FIG. 8 is a block diagram illustrating an example computing device 800 that can be utilized to provide a safety scheme for a gesture-based game system in accordance with at least some embodiments described herein. In these examples, elements of computing device 800 may be arranged or configured for a gesture-based game system. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include instructions 826 that may be arranged to perform the functions as described herein including the actions described with respect to the gesture-based game system 400 architecture as shown in FIG. 4 or including the actions described with respect to the flow charts shown in FIG. 5. Program data 824 may include gesture-based game data 828 that may be utilized for implementing instructions 826 (e.g., barrier image generation). In some examples, application 822 may be arranged to operate with program data 824 on an operating system 820 such that implementations for instructions for a gesture-based game system as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a gesture-based game system comprising one or more processors, comprising:
    detecting, by the one or more processors, a presence of at least one first obstacle between a first distance from a player and a second distance from the player that is less than the first distance; and
    determining, by the one or more processors, a recommended position for the player based at least in part on a location of the at least one first obstacle and player gestures associated with a game facilitated by the gesture-based game system, so as to maximize a distance between the player and a closest one among the at least one first obstacle, within the first distance.

2. The method of claim 1, wherein the recommended position is determined for the player to play the game facilitated by the gesture-based game system without colliding with the at least one first obstacle.

3. The method of claim 1, wherein at least one of the first distance and the second distance are based on the game facilitated by the gesture-based game system.

4. The method of claim 1, further comprising:
    generating in a display area at least one first outline image respectively associated with the at least one first obstacle.

5. The method of claim 1, wherein the detecting further comprises:
    detecting a presence of at least one second obstacle within the second distance from the player.

6. The method of claim 5, further comprising:
    notifying the player of the presence of the at least one second obstacle.

7. The method of claim 6, wherein the notifying includes generating in a display area at least one second outline image respectively associated with the at least one second obstacle.

8. The method of claim 5, wherein the determining the recommended position is performed when no second obstacle is detected within the second distance from the player.

9. The method of claim 1, further comprising:
    generating in a display area a position image associated with the recommended position for the player.

10. A position recommendation component for a gesture-based game system, comprising:
    an obstacle detecting unit configured to detect a presence, and determine a location, of at least one first obstacle between a first distance from a player and a second distance from the player that is less than the first distance;
    a recommended position determining unit configured to determine a recommended position for the player based at least in part on the location of the at least one first obstacle so as to maximize a distance between the player and a closest one among the at least one first obstacle, within the first distance; and an image generation unit configured to generate at least one image to guide the player to the recommended position.

11. The position recommendation component of claim 10, wherein the obstacle detecting unit is further configured to receive a signal from a camera and determine the location of the at least one first obstacle based at least in part on the received signal.

12. The position recommendated component of claim 10, wherein the recommended position is determined for the player to play a game facilitated by the gesture-based game system without collision with the at least one first obstacle.

13. The position recommendation component of claim 10, wherein at least one of the first distance and the second distance is based on a game facilitated by the gesture-based game system.

14. The position recommendation component of claim 10, wherein the image generation unit is further configured to generate at least one first outline image respectively associated with the at least one first obstacle located between the first distance and the second distance.

15. The position recommendation component of claim 10, wherein the obstacle detecting unit is further configured to detect a presence, and determine a location, of at least one second obstacle within the second distance from the player, and wherein the position recommendation component further comprises:
a notifying unit configured to notify the player of the presence of the at least one second obstacle.

16. The position recommendation component of claim 15, wherein the image generation unit is further configured to generate at least one second outline image respectively associated with the at least one second obstacle.

17. The position recommendation component of claim 10, wherein the image generation unit is further configured to generate a position image associated with the recommended position.

18. A non-transitory computer-readable storage medium having stored thereon computer-executable instructions that, in response to execution, cause a gesture-based game system to perform operations, comprising:

detecting one or more obstacles located within a first distance from a player;

generating an alarm if at least some of the detected obstacles are located within a second distance from the player that is less than the first distance;

determining a recommended position for the player based at least in part on locations of the detected one or more obstacles if all of the detected one or more obstacles are located between the second distance and the first distance so as to maximize a distance between the player and a closest one among the one or more obstacles, within the first distance; and guiding the player to the recommended position.

19. The non-transitory computer-readable storage medium of claim 18, wherein at least one of the first distance and the second is based on a game hosted by the gesture-based game system.

20. The non-transitory computer-readable storage medium of claim 18, further comprising:

generating in a display area one or more outlines respectively associated with the detected one or more obstacles.

21. The non-transitory computer-readable storage medium of claim 18, wherein the determining the recommended position includes determining the recommended position so as to maximize a distance between the player and a closest one among the detected one or more obstacles, within the first distance.

22. The non-transitory computer-readable storage medium of claim 18, wherein the guiding includes:

generating in a display area a position image associated with the recommended position for the player.

* * * * *

UNITED STATES PATENT AND TRADEMARK OFFICE
CERTIFICATE OF CORRECTION

| | |
|---|---|
| PATENT NO. | : 8,790,179 B2 |
| APPLICATION NO. | : 13/636794 |
| DATED | : July 29, 2014 |
| INVENTOR(S) | : Kim |

It is certified that error appears in the above-identified patent and that said Letters Patent is hereby corrected as shown below:

In the Claims,

In Column 15, Line 9, in Claim 12, delete "recommendated" and insert -- recommendation --, therefor.

Signed and Sealed this
Sixteenth Day of December, 2014

Michelle K. Lee
*Deputy Director of the United States Patent and Trademark Office*